United States Patent [19]

Drabowitch et al.

[11] Patent Number: 4,672,378

[45] Date of Patent: Jun. 9, 1987

[54] METHOD AND APPARATUS FOR REDUCING THE POWER OF JAMMING SIGNALS RECEIVED BY RADAR ANTENNA SIDELOBES

[75] Inventors: Serge Drabowitch; Claude Aubry; Daniel Casseau, all of Paris, France

[73] Assignee: Thomson-Csf, Paris, France

[21] Appl. No.: 496,563

[22] Filed: May 20, 1983

[30] Foreign Application Priority Data

May 27, 1982 [FR] France ............................... 82 09257

[51] Int. Cl.[4] .................................................. G01S 7/36

[52] U.S. Cl. ....................................... 342/17; 342/379

[58] Field of Search ..................... 343/379, 18 E, 754, 343/778, 844, 853, 893, 427, 368, 373, 378, 380, 381, 383, 384

[56] References Cited

U.S. PATENT DOCUMENTS

| | | | |
|---|---|---|---|
| 2,825,900 | 3/1958 | Collbohm | 342/380 |
| 3,245,081 | 4/1966 | McFarland | 343/844 |
| 3,290,684 | 12/1966 | Renn et al. | 342/381 |
| 3,438,044 | 4/1969 | Elia et al. | 343/427 |
| 3,731,316 | 5/1973 | Sheleg | 343/778 |
| 3,803,613 | 4/1974 | Wright | 343/427 |
| 3,981,014 | 9/1976 | Masak | 343/380 |
| 4,070,675 | 1/1978 | Daniel et al. | 343/380 |
| 4,097,866 | 6/1978 | Frost et al. | 343/380 |
| 4,117,494 | 9/1978 | Frazita | 343/844 |
| 4,146,889 | 3/1979 | Brennan et al. | 343/380 X |
| 4,177,464 | 12/1979 | Masak | 342/380 |
| 4,213,130 | 7/1980 | Vaessen | 343/427 |
| 4,246,585 | 1/1981 | Mailloux | 342/373 |
| 4,370,655 | 1/1983 | Masak | 343/383 |
| 4,462,034 | 7/1984 | Betsudan et al. | 343/761 |

FOREIGN PATENT DOCUMENTS

| | | |
|---|---|---|
| 2642144 | 3/1978 | Fed. Rep. of Germany . |
| 2246880 | 5/1975 | France . |

OTHER PUBLICATIONS

S. Drabowitch et al.; "Application Des Proprietés Spatiales Des Antennes Aux Techniques D'Opposition Des Lobes Secondaries"; Proceedings of the 8th Colloquium on Signal Processing and its Applications; (Nice, France; 1 to 5 Jun. '81; pp. 371-376).

F. Floyd et al., "Some Effects of Hard Limiting in Adaptive Antenna Systems"; IEEE Trans. on Aerospace and Elect. Systems; (vol. 16, No. 6; 11/80; pp. 839-850).

A. Farina et al., "Wide Deterministic Nulling by Means of Multaplicative Array Techniques"; Proc.s of the 11th European MW Conf; (7-11 Sep. '81; pp. 805-812).

P. Howells et al., "Explorations in Fixed and Adaptive Resolution at GE and Surc"; IEEE Trans. on Antis and Prop.; (vol. Ap-24, No. 5; 9/76; pp. 575-584).

S. Applebaum, "Adaptive Arrays"; IEEE Trans. on Ant.s and Prop.; (vol. Ap-24, No. 5; 9/76; pp. 585-598).

D. Davies et al., "Electronic Steering of Multiple Nulls for Circular Arrays"; Electronics Letters; (vol. 13, No. 22; 10/77).

M. Johnson et al., "Eccm from the Radar Designers Viewpoint"; Microwave Journal; (3/78; pp. 59-63).

"Adaptive Arrays"; S. P. Applebaum; *IEEE Transactions on Antennas and Prop.;* 9/76; p. 593.

*Radar Handbook,* M. I. Skolnik; 1970;l "Sidelobe Reduction", pp. 29-18.

M. Skolnik, *Intro. to Radar Systems;* p. 136, (McGraw-Hill, 1980).

*Primary Examiner*—Thomas H. Tarcza
*Assistant Examiner*—Bernarr Earl Gregory
*Attorney, Agent, or Firm*—Cushman, Darby & Cushman

[57] ABSTRACT

Secondary lobe cancellation (SLC) is used to reduce the power of jamming signals received by the sidelobes of a main radar antenna. The signal from the radiation pattern of the main antenna is summed with signals from auxiliary radiation patterns. Each auxiliary pattern is chosen to be directional, to have a null or at least a gain minimum in the direction of maximum radiation in the main antenna pattern, to have its phase center close to that of the main antenna pattern, and to have gain minimums in those directions for which the sidelobes of the main antenna pattern are low enough to be insensitive to jamming signals. The various patterns may all be derived from an array antenna, e.g. a multibeam antenna, an aplanatic lens antenna, or a chandelier fed antenna.

21 Claims, 16 Drawing Figures

FIG_1 (PRIOR ART)
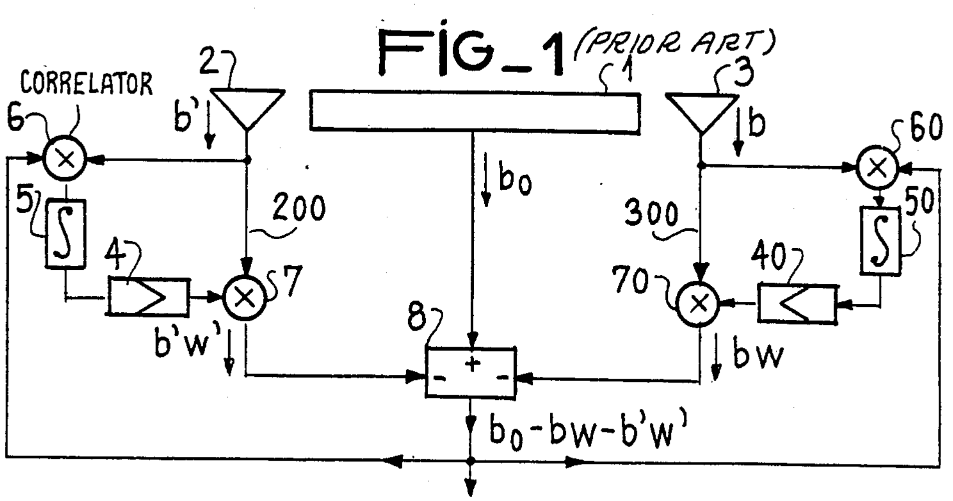
FIG_2-a
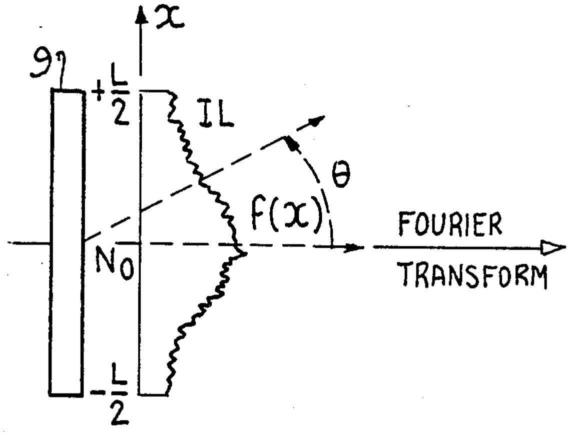
FIG_2-b
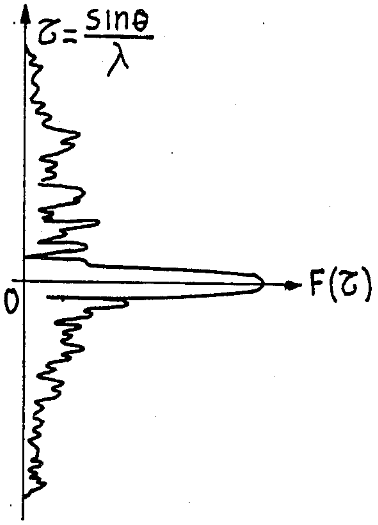
FIG_3
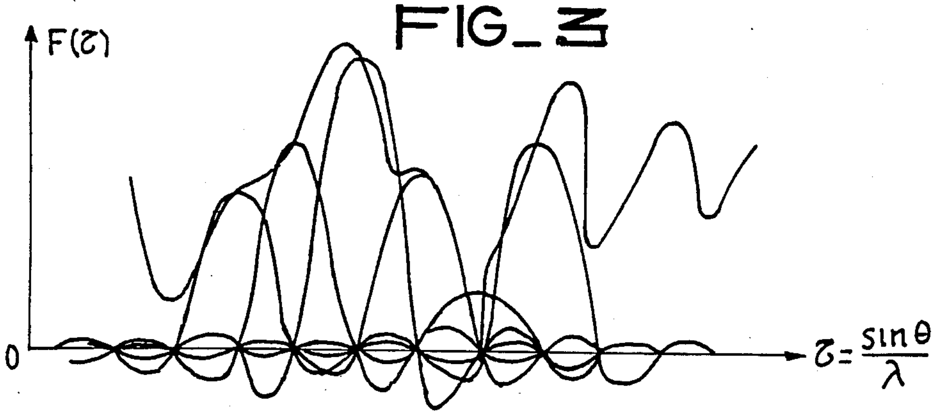

FIG_4-a
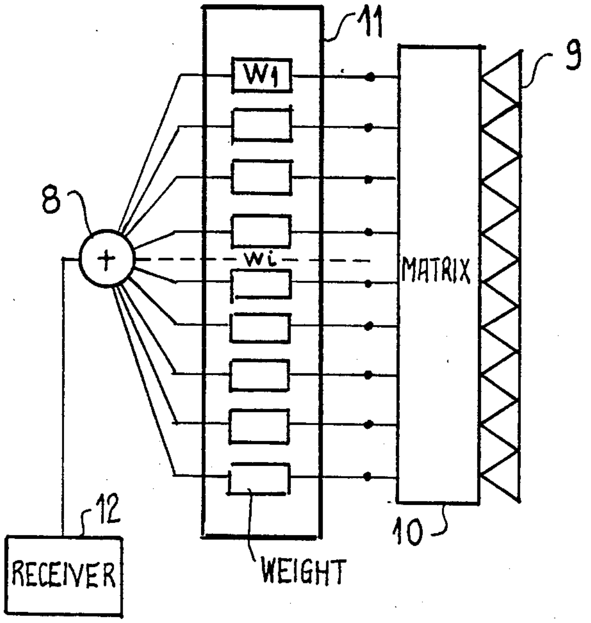
FIG_4-b
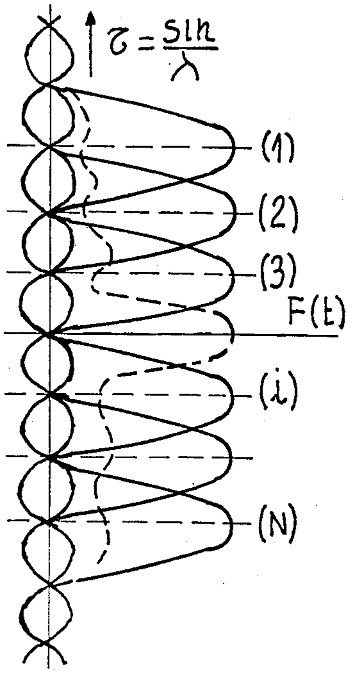
FIG_5
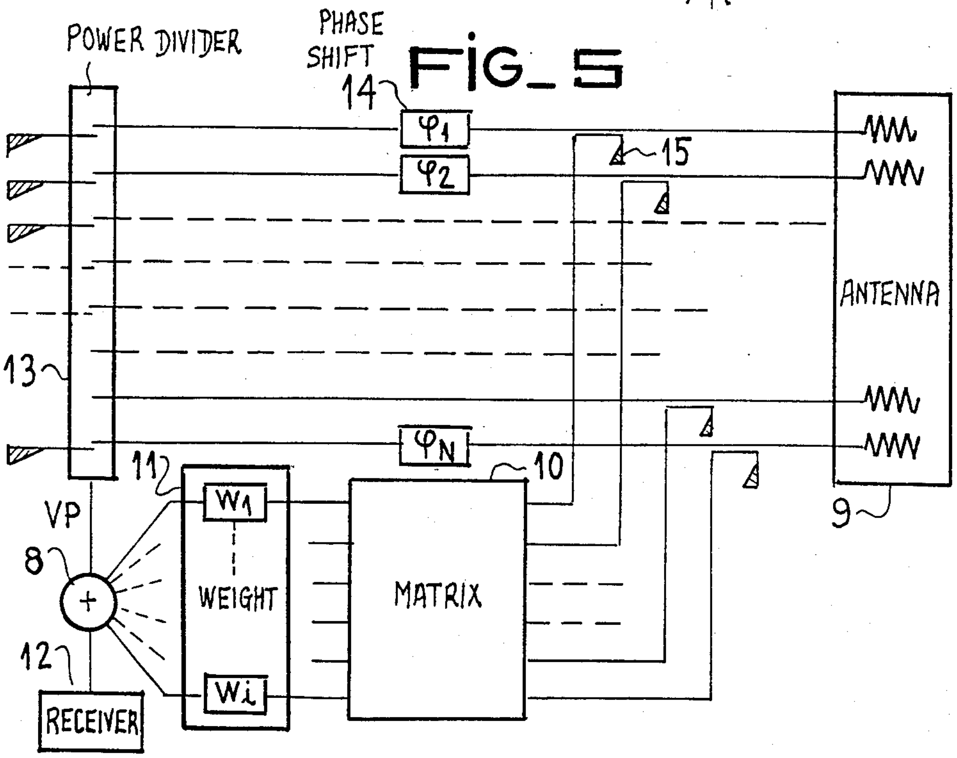

METHOD AND APPARATUS FOR REDUCING THE POWER OF JAMMING SIGNALS RECEIVED BY RADAR ANTENNA SIDELOBES

The present invention relates to a method and to apparatus for reducing the power of jamming signals received by the sidelobes of a radar antenna. These signals are generally active jamming signals which may be of natural or of artificial origin; they may be continuous or pulsed, and sometimes they are transmitted by several independent jammers. In any event, they add to the internal noise of the associated receivers.

BACKGROUND OF THE INVENTION

Generally speaking, such jamming signals are received by the secondary lobes of a radar antenna at such a level that they considerably reduce the signal-to-noise ratio and completely peturb operation of the radar.

In order to reduce the interference thus produced on the useful signal, techniques have been developed known as secondary lobe cancelation (SLC). This countermeasure technique is descibed in outline in an article by M. A. Johnson and D. C. Stoner entitled "ECCM from the radar designer's viewpoint" published in the Microwave Journal, March 1978 at pages 59 and 60. This technique consists in adapting the radiation pattern of the receiver antenna as closely as possible to its environment in such a manner as to maximize the ratio of useful signal to the total interference. The adaption is done by using the reception paths of auxiliary antennas. The radiation patterns of the auxiliary antennas are combined with the pattern of the main antenna in question in such a manner as to obtain an overall pattern having nulls, or at least minimums, in the directions of the external jammers, while at the same time avoiding excessive amplification of the internal noise associated with the auxiliary antennas.

FIG. 1 summarizes the conventional circuit of a multijammer SLC system comprising a plurality of decorrelation loops.

A conventional SLC system is a "loop" system principally comprising a main antenna 1 and auxiliary antennas 2, 3, each of which is associated with a respective reception path 200, 300. Each reception path includes a loop comprising an amplifier 4, (40), an integrator 5, (50), a correlator 6, (60), and a control mixer 7, (70).

In such a prior art SLC system, each of the auxiliary signals b, (b') as received by an auxiliary antenna is subtracted in a summing circuit 8 from the main signal bO as received by the main antenna. The subtractions take place after the auxiliary signals have been multiplied by respective weighting coefficients W, (W') which are servo-controlled to the correlation existing between the corresponding auxiliary signal and the signal as used, in such a manner that the signal as used takes the form: $bO-bW-b'W'$. The noise is then minimum.

If a non-loop system is used, the optimum weighting coefficients may be calculated by a method which is equivalent to inverting the covariance matrix of the main signal by the auxiliary signals.

However, whichever algorithm is used, it can be shown that the choice of auxiliary antennas affects the speed at which the algorithm converges, the final improvement factor, the signal-to-jamming ratio, the bandwidth of the system, and the vulnerability of the system to additional jammers.

It thus appears that the auxiliary patterns, ie. the patterns of the auxiliary antennas, are important, and in the present invention, these patterns must be chosen carefully.

Generally, SLC auxiliary antennas, ie. antennas associated with prior art SLC systems, are not very directional, and they are often located around the periphery of the main antenna. Such a disposition has several drawbacks.

Since the auxiliary antennas are not very directional, and are sometimes practically omnidirectional, a single auxiliary antenna may cover several jammers in its pattern, thereby reducing the efficiency and the convergence speed of the weighting loops.

Since the gain of such an auxiliary antenna is low, a relatively high weighting coefficient must be applied to the signal it provides. This runs the risk of introducing a proportionately large friction of thermal noise from the associated receiver into the main path, thereby reducing the final improvement factor in the signal-to-jamming ratio. The improvement factor is the ratio of the signal-to-noise ratio with and without application of the noise power reducing method. In other words, the signal-to-noise ratio when the noise reducing method is applied divided by the signal-to-noise ratio when it is not applied.

The auxiliary pattern is broad and thus picks up parasitic echos known as clutter, thereby reducing the efficiency of the system.

The phase center of an auxiliary antenna is generally far from the phase center of the main antenna, and the associated weighting coefficient Wi is very sensitive to frequency.

For example, in the case of a frequency-agile radar, the weighting coefficient must change very quickly, thereby preventing the system from having a very large bandwidth.

Further, the overall pattern resulting from the combination of the main antenna pattern with the patterns of the poorly directional auxiliary antennas has sidelobes which are peturbed by the fact that the lobes of the auxiliary antennas pick up jammers which do not interfere with the main antenna when used on its own.

It can also be shown that there exist combinations of jammer directions and non:directive auxiliary antennas which do not converge to any solution at all. The set of quasi-point auxiliary sources together with their weighting coefficients constitute a pattern which is angularly periodic, while the sidelobes of the main antenna are not angularly periodic. Since the SLC system cancels one with the another, any arrangement which cancels in one direction is unlikely to cancel in other directions at one or more angular periods therefrom.

Preferred implementations of the present invention provide a method and apparatus for reducing the power of jamming signals received by the side lobes of a radar antenna which mitigate the drawbacks outlined above.

SUMMARY OF THE INVENTION

The present invention provides a method of reducing the power of jamming signals received by the sidelobes of a radar antenna, the method being of the type in which a main antenna radiation pattern is combined with auxiliary antenna radiation patterns in such a manner as to obtain an overall radiation pattern having minimums in the directions of external jammers, wherein each auxiliary antenna radiation pattern is chosen to be directional, to have a null or at least a gain minimum in the direction of maximum radiation in the main antenna pattern, to have its phase center close to that of the main antenna pattern, and to have gain minimums in those directions for which the sidelobes of the main antenna pattern are low enough to be insensitive to jamming signals.

Preferably the signals from the auxiliary antenna patterns are weighted prior to being combined with the signal from the main antenna pattern, said weighting comprising multiplication by respective weighting coefficients which are continuously adapted by respective correlation loops. Advantageously, the speed of convergence of said correlation loops is increased by disposing amplitude limiters therein.

The function of the limiters is to reduce the spread of the spectrum of the proper (or Eigen) values of the covariance matrix. Using $b_i$ to designate the signals in the various auxiliary paths ($i=1, 2, \ldots$), the covariance matrix is the matrix having terms $R_{ik}$ equal to the correlation coefficient between the signals $b_i$ and $b_k$, ie. $R_{ik}$=the average value of ($b_i$ bk*). Under such conditions, there is an increase in the speed of convergence of the correlation loops (also known as optimization loops).

The present invention also provides apparatus for performing the above-defined method.

BRIEF DESCRIPTION OF THE DRAWINGS

Embodiments of the invention are described by way of example with reference to the accompanying drawings, in which:

FIG. 1 is a block diagram of a prior art sidelobe cancelling system already described;

FIG. 2*a* shows a linear array together with its illumination;

FIG. 2*b* is a typical radiation pattern for the array of FIG. 2*a;*

FIG. 3 shows the same radiation pattern after sampling;

FIG. 4*a* is a schematic representation of a multibeam antenna;

FIG. 4*b* shows various sampled radiation patterns of the antenna shown in FIG. 4*a;*

FIG. 5 is a schematic representation of a variant multibeam antenna;

MORE DETAILED DESCRIPTION

Figure 6:
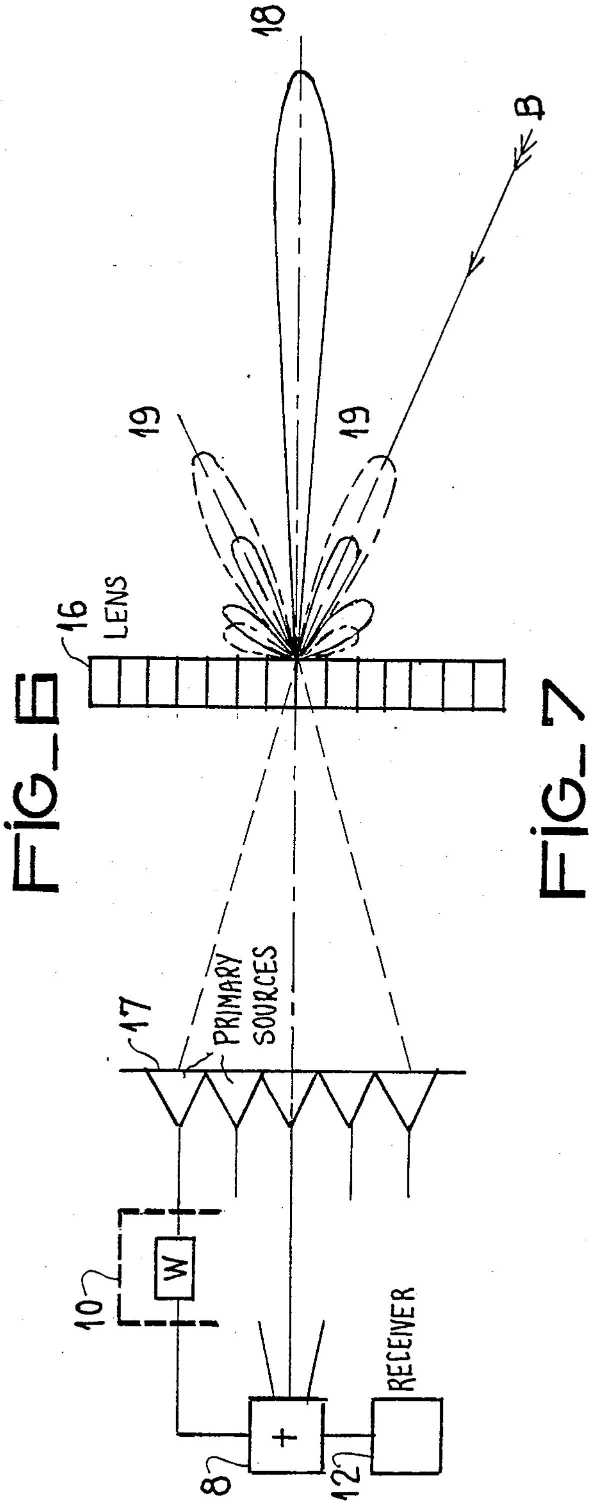
FIG. 6 shows a lens-fed array antenna.

The introduction to the present specification describes the drawbacks of prior radar sidelobe cancellation systems which the present invention seeks to mitigate. It further explains that the drawbacks are due to the low directivity of the auxiliary antennas which are associated with the main antenna and which provide signals that are combined with the main antenna signal in such a manner as to reduce the power of jamming signals received on the sidelobes of the main antenna.

The present invention is then summarized in terms of conditions to be satisfied by auxiliary radiation patterns so that when they are combined with the main radiation pattern, a reduction is obtained in the power of the jamming signals while at the same time the above-mentioned drawbacks are absent or much reduced.

Essentially, in accordance with the present invention, the auxiliary antenna patterns must be highly directional. Under such conditions, each auxiliary antenna pattern will generally only receive a single jammer in its main lobe. A set of highly directional antenna patterns thus performs space prefiltering. High directivity generally leads to a large increase in auxiliary antenna gain: this means that the appropriate weighting coefficient is small and little of the auxiliary antenna's receiver noise is added to the total noise, thereby ensuring a good improvement factor.

The fact that the auxiliary antenna pattern has a null in the direction of maximum radiation in the main antenna pattern, or at least a gain minimum in said directiond, avoids the auxiliary pattern picking up clutter. The main pattern is not disturbed and the gain in the other useful zones is reinforced.

The fact that the phase center is close to that of the main pattern favors wide band optimization. Further, the gain minimums in the directions where the main pattern gain is low enough to make it insensitive to jamming avoids the auxiliary patterns picking up jammers in those directions.

A first implementation of the invention is now described explaining how an antenna structure may be defined to obtain optimized auxiliary radiation patterns meeting the stipulated requirements. The radiation patterns in question are sampling patterns produced by a linear array antenna.

FIG. 2*a* diagrammatically shows a linear array 9 of length L extending along an X-axis. It is illuminated by illumination IL defined by a complex scalar function f(x) limited to the range (−L/2, +L/2). The array radiates in a direction 8 measured from the normal N according to a pattern $F(\tau)$ which is represented in FIG. 2*b* by the Fourier transform of f(x), ie.

$$F(\tau) = \int_{-L/2}^{+L/2} f(x) e^{i2\pi n \tau} dx$$

where $\tau=(\sin\theta)/\lambda$, $\lambda$ being the wavelength and $\theta$ being the angle of the direction measured from the normal N to the array 9.

Since the pattern has a limited support spectrum, it follows from the sampling theorem that it may be represented as shown in FIG. 3 by a linear combination of elementary sampling patterns having the form:

$$F(\tau) = \sum_k a_k \frac{\sin(\pi L\tau - k\pi)}{\pi L\tau - k\pi}$$

Each of the sampling patterns has the characteristics required in accordance with the invention for an auxiliary pattern.

It should be observed that if the antenna structure is such that each sampling pattern (of which there are N) has a separate input, as is the case of an array excited by a Butler matrix or its equivalent, then it is possible to adjust the coefficients $a_k$ in such a manner as to cancel the resulting pattern in the directions of N jammers. This is done, as outlined above, by summing the signals received by the elementary antenna patterns after weighting them by coefficients which are adapted to maximize the ratio of signal to total noise.

Elementary patterns meeting the stipulated requirements are thus obtained from a multibeam antenna whose elementary radiation patterns are directional, adjacent, preferably orthogonal, and cover the angular range over which protection is required from jammers.

Such an antenna is shown in FIG. 4*a* in a highly schematic manner. It shows the linear array 9 of elementary antennas fed from a matrix 10 which may be a Butler or a Maxson matrix. Each feed path includes a weighting circuit 11 which applies a weighting coefficient Wi to the signal passing therethrough in known manner. The paths are connected to a summing circuit 8 which also receives the main path, and which feeds a receiver 12 with a signal in which jamming signals are absent, or at least greatly attenuated. FIG. 4*b* shows the radiation patterns of the various elementary antennas 1 through N which contribute to the sampling patterns defined above.

FIG. 5 is a diagrammatic representation of a multibeam antenna having elementary radiation patterns which meet the requirements stipulated above, and which is advantageously used to reduce the power of jammers picked up by the antenna. The array antenna 9 is fed from a power divider 13 via phase shifting circuits 14 which establish the main path. The auxiliary paths are established by couplers 15 placed ahead of the phase shifters 14 and which divert a portion of the incident energy to a Butler matrix 10 being also connected to weighting circuits 11 and connected to a summing circuit 8 which also receives the main path VP. The summing circuit is connected to a receiver 12.

Other array antennas can also be used to implement the invention, and in particular lens-fed array antennas are suitable. The lens is preferably aplantic. In an antenna of this type, as shown diagrammatically in FIG. 6, primary sources 17 of a lens 16 generate the required auxiliary radiation patterns 19 around the main path 18. The phase and amplitude weighed summing of the signals received by auxiliary pattern 19, which receives a jammer B, to the signals received by the main pattern 18 provides resultant signals in which the jammer is attenuated.

Figure 7:
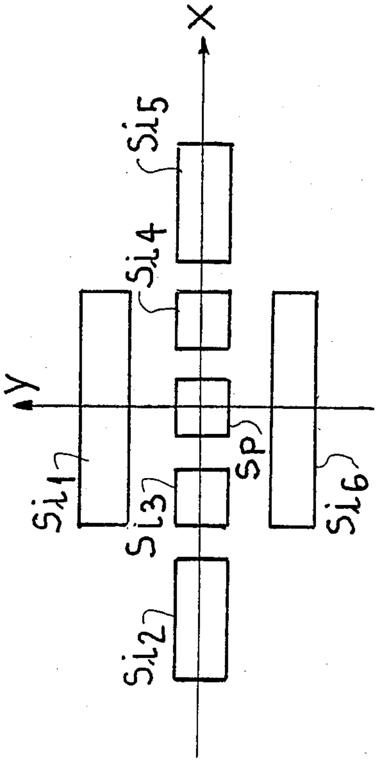
FIG. 7 shows a complex primary source feeding a multibeam antenna.

In the same antenna field, reflector array antennas fed from an array of sources may also be used. In this case, as in the previous case, the primary source may be complex and installed in a particular configuration. FIG. 7 shows such a primary source which provides for best use of the antenna in the context of the present invention. The two antenna systems described above are particularly effective against multiple jammers located in directions which are not too far removed from the main lobe; ie. within a few 3 dB widths therefrom. However, if the jammers are in a "horizontal" plane around the useful lobe, which is frequently the case for powerful distant jammers, the sources should be located as shown in FIG. 7. A main monopulse source SP giving rise to the main lobe is located at the intersection of a pair of axes OX and OY, and six auxiliary sources Si (i=1 through 6) are distributed around the main source. The auxiliary sources are capable of establishing radiation patterns which are in accordance with the invention, but which are not identical to each other, depending on the probable distribution of jammers.

Other types of array antennas may also be used in accordance with the invention to reduce the power of jammers. These are array antennas fed by chandelier dividers which may be made from various technologies such as coaxial cables, three-layer plates, printed circuits, etc. The main path is constituted by the main excitation inlet, or the sum "S" inlet which produces symmetrical equiphase illumination with bell-shaped roll-off. However, because of imperfections in maintaining exact phase and amplitude along the array in the frequency band to be covered, the main path in accompanied by diffuse sidelobes which are liable to pick up interference signals due to external jammers. In order to obtain auxiliary radiation patterns meeting the requirements stipulated at the beginning of the description, the elementary couplers which usually interconnect chandelier branches are replaced by directional couplers of the magic-T or hybrid ring type. Not all of the couplers need to be replaced, but at least some of them must be.

Figure 8:
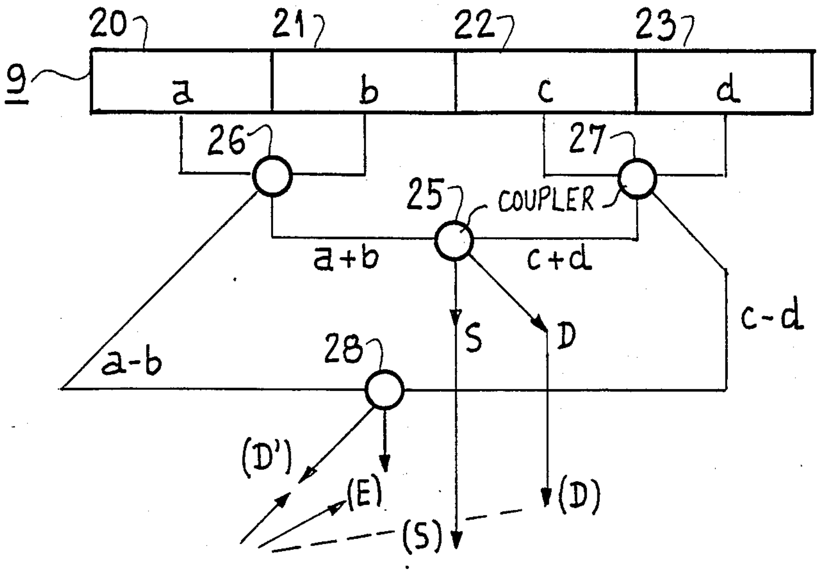
FIG. 8 shows a chandelier-fed multibeam antenna.

By way of example, FIG. 8 is a highly schematic representation of a linear array of length L fed from a chandelier in such a manner that four symmetrically arranged sub-arrays 20, 21, 22, and 23 can be distinguished. They are fed at the same power and in phase by a set of couplers 25, 26, 27, and 28, eg. magic-Ts. Various patterns can then be defined. The central coupler 25 defines a sum path S giving the main pattern, and a difference path D giving a difference pattern which constitutes one of the auxiliary patterns as used in the present invention.

Each of the couplers 26 and 27 has a difference path connected via the same length of line to a magic-T or hybrid coupler 28 which provides the sum and the difference of the signals applied thereto, thereby defining two further auxiliary patterns which may be called the separation pattern and the double difference pattern. If the amplitudes of the signals produced by the arrays 20 to 23 are designated a, b, c, and d respectively, the separation path provides a pattern $((a-b)+(c-d))$, while the double difference path provides a pattern $((a-b)-(c-d))$.

Figure 9:
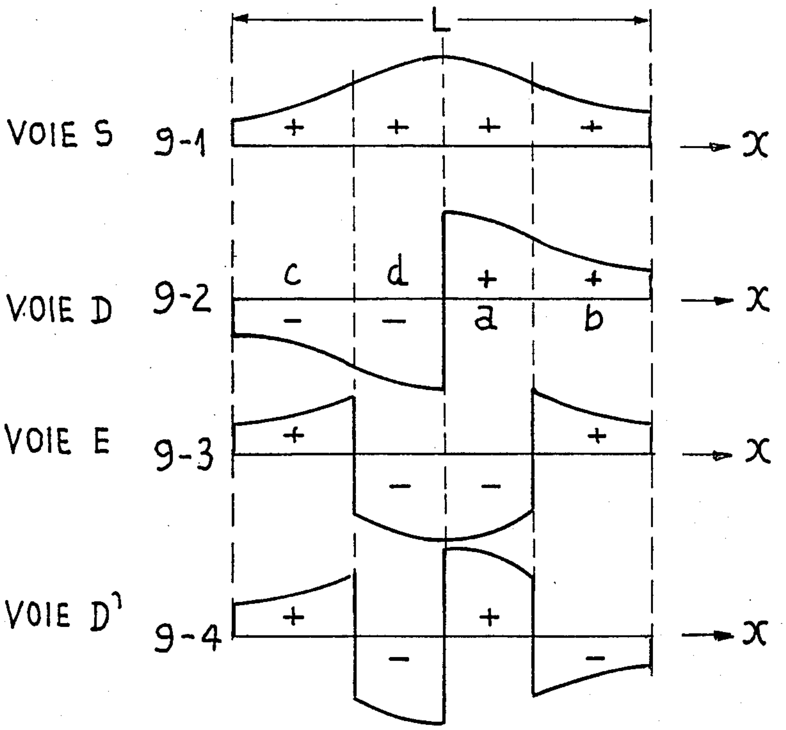
FIG. 9 shows the illumination laws applicable to radiation patterns for the FIG. 8 antenna.
Figure 10:
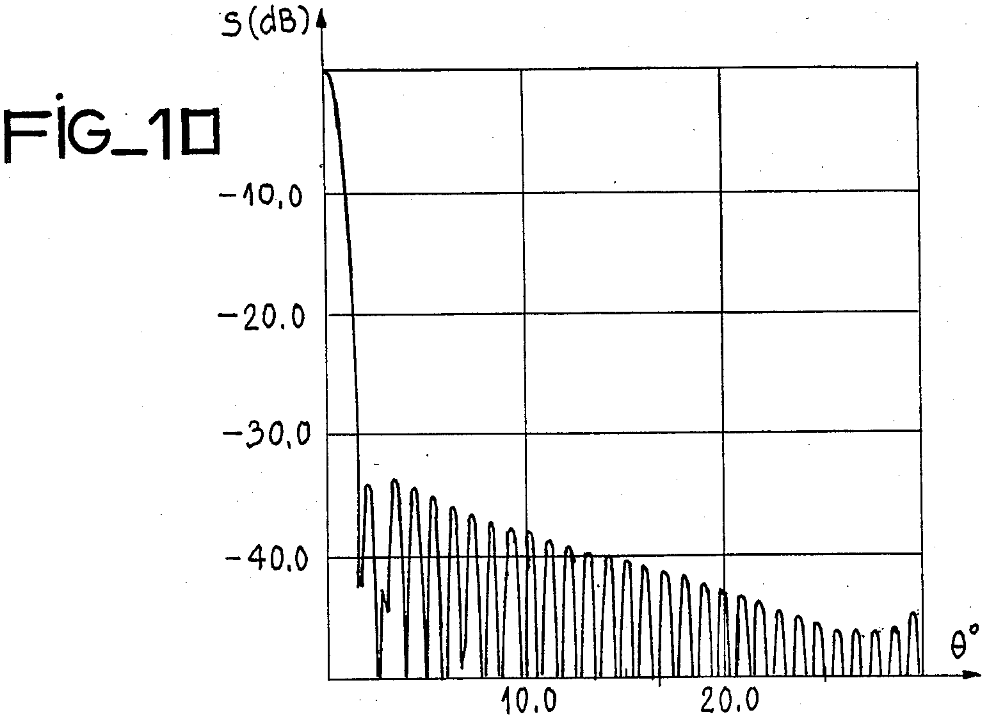
FIG. 10 is the sum path (S) pattern.
Figure 11:
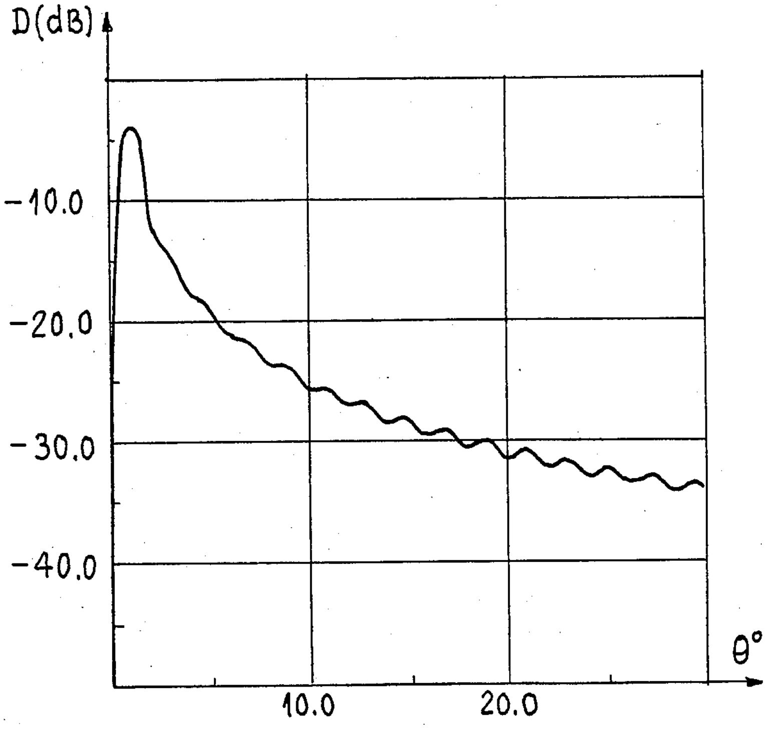
FIG. 11 is the difference path (D) pattern.
Figure 12:
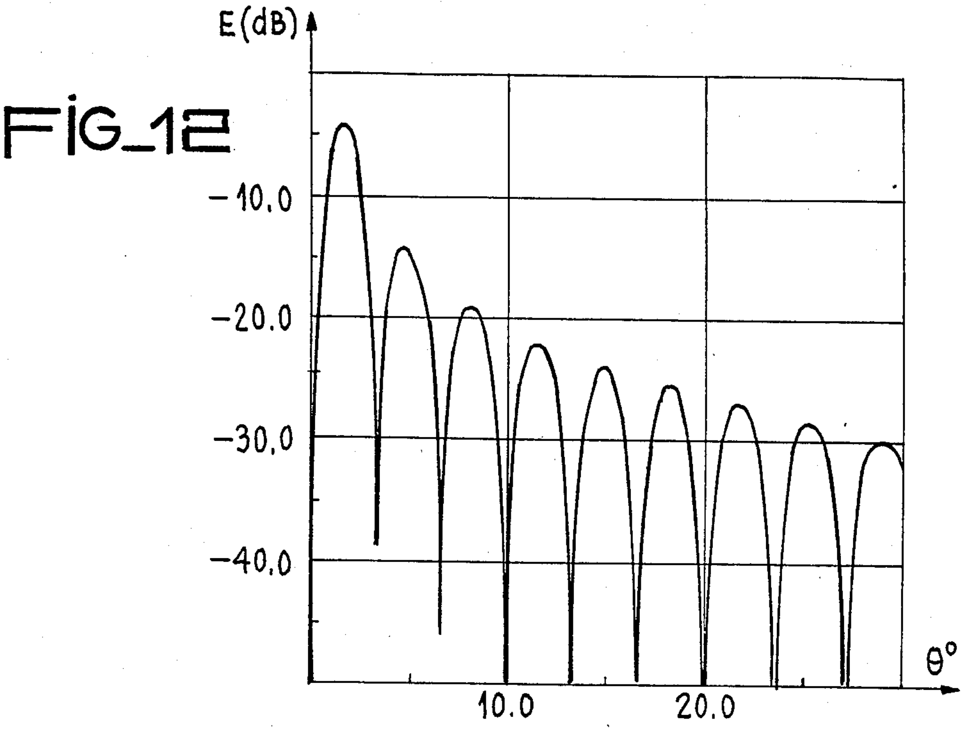
FIG. 12 is the separation path (E) pattern.
Figure 13:
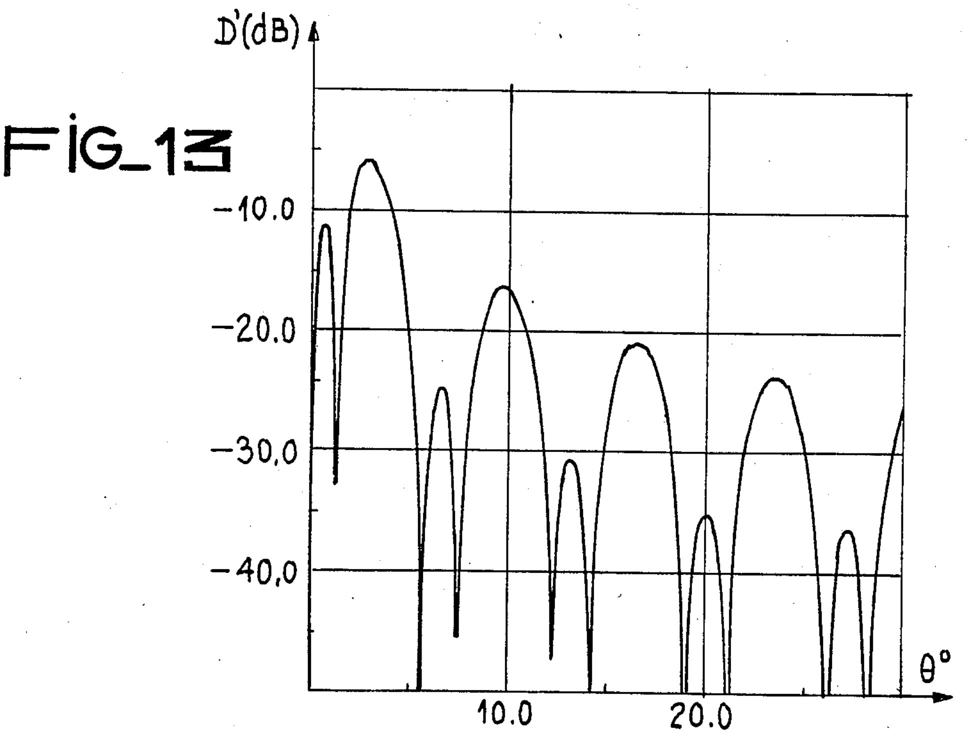
FIG. 13 is the double difference path (D') pattern.

FIG. 9 shows the illumination laws of the various paths defined on the array antenna of FIG. 8. FIGS. 10 to 13 show the radiation patterns in dB as a function of the angle O in degrees for the main path and for the auxiliary paths. It can be seen that these patterns meet the requirements stipulated at the beginning of the present description.

1. The auxiliary patterns have a null on the axis.
2. The difference auxiliary pattern has relatively high gain compared with the sum pattern sidelobes, even for side-lobes which are a long way off axis.
3. The phase centers of the auxiliary illuminations coincide with that of the main path.
4. The separation (E) and the double difference (D') auxiliary patterns have alternating nulls; thus if a jammer lies in the null of one of the auxiliary patterns, it will be received by the other. This is a step towards space prefiltering.

At the beginning of the present description it was mentioned that there is a relationship between the spread of the spectrum of the Eigenvalues of the covariance matrix and the performance of the method being applied to reducing the power of the jamming signals received by the sidelobes of the radar antenna. Indeed, if the system is to be effective over the entire dynamic range of the Eigenvalues, or over the entire dynamic range of the jamming when a diagonal matrix is being used, the adaptation time is proportional to the dynamic range.

Supposing that each jammer is picked up by only one of the auxiliary patterns, and further that the jamming levels received by the auxiliary patterns are all equal, then the correlation loops are completely decoupled and the covariance matrix operates in parallel and in identical manner. However, such a situation is equivalent to the relatively problem-free situation of an SLC system for cancelling a single jammer. If the auxiliary arrays are sifficiently directional for each to pick up only one jammer, with the other jammers lying on sidelobes of the array in question, then the covariance matrix is usually diagonal dominated. The partial decoupling thus obtained for the correlation loops can be used to improve the dynamic performance of the system. To do this, the invention proposes the insertion of a limiter between each auxiliary antenna pattern and its associated correlation mixer.

Figure 14:
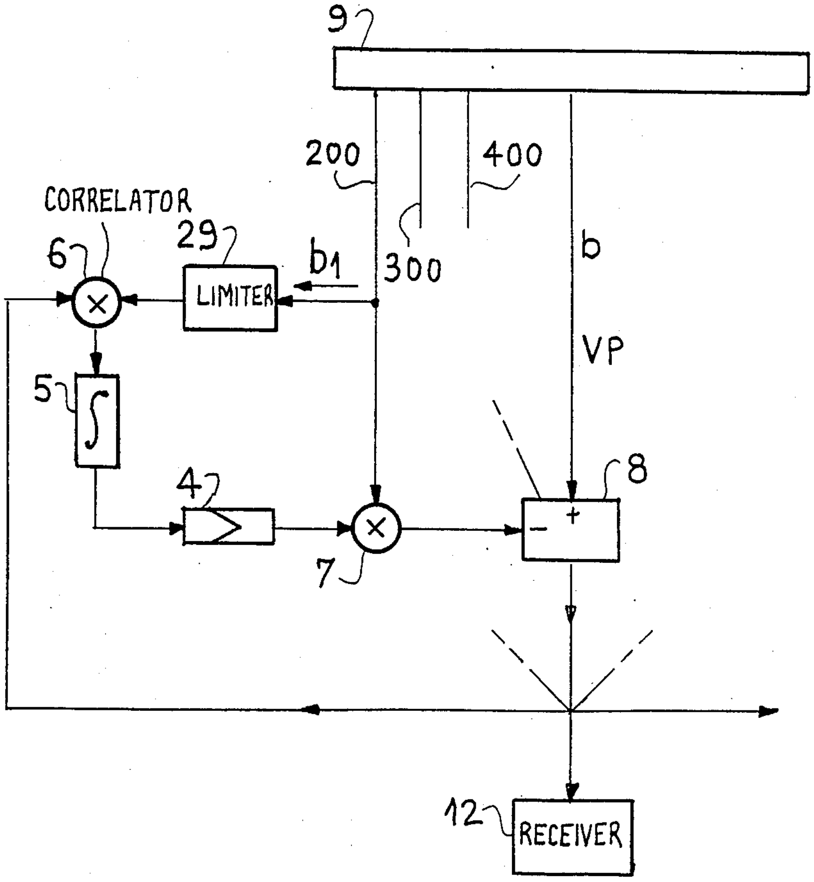
FIG. 14 is a block diagram of apparatus in accordance with the invention and having limiters.

FIG. 14 is a highly simplified diagram of apparatus made in this way. The array antenna 9 establishes a main path VP and auxiliary paths 200, 300, etc., each of which is connected to a summing circuit 8. In the correlation loop shown in FIG. 14, a limiter 29 is inserted on the path of the auxiliary antenna signal $b_i$ and the correlator 6. This is done for each correlation loop.

If the auxiliary antenna patterns are poorly directional, or even omnidirectional, all the Eigenvalues of the matrix are multiplied by the same constant. Thus the dynamic range of the Eigenvalues is unchanged and there is no increase in convergence speed. However, if the auxiliary antenna patterns are directional, there is a saving by a factor of approximately two on the dynamic range expressed in dB. This leads to a considerable increase in system convergence speed.

A method of reducing the power of jamming received by the sidelobes of a radar antenna, and apparatus for implementing the method have thus been described.

What is claimed is:

1. A method of reducing the power of jamming signals produced by a jamming source and received by the sidelobes of a sole radar antenna not utilizing a secondary antennas, comprising the steps of:

providing from said antenna a main radiation pattern having a maximum radiation lobe in a given direction, sidelobes, and a phase center;

providing from said antenna a plurality of auxiliary radiation patterns, each auxiliary pattern being directional and having a minimum gain in the direction of said main pattern maximum radiation lobe, each auxiliary pattern haing a phase center in near proximity to said main pattern phase center; and combining said main and auxiliary patterns to provide an overall pattern having a minimum in the direction of said jamming source.

2. A method according to claim 1 wherein said jamming signals are received from a plurality of jamming sources, and wherein said combining step provides an overall pattern having minimums in the directions of said jamming sources.

3. A method according to claim 1 wherein said combining step includes the step of providing an overall pattern having gain minimums in directions inwhich said main pattern sidelobes are substantially insensitive to jamming signals.

4. A method according to claim 3 further including the steps of:

subjecting signals from said auxiliary patterns to weighting by continuously adaptive weighting coefficients;

summing the weighted auxiliary pattern signals with signals from said main pattern; and subjecting said auxiliary pattern signals to amplitude limitation prior to the determination of said weighting coefficients.

5. Apparatus for reducing the power of jamming signals produced by a jamming source and received by a sole radar antenna not utilizing a secondary antenna, said sole antenna comprising:

a multibeam linear array antenna for providing (a) a main radiation pattern having a main radiation lobe in a given direction, sidelobes, and a phase center, (b) a plurality of auxiliary radiation patterns, each being directional and having a minimum gain in the direction of said main pattern maximum radiation lobe, each auxiliary pattern having a phase center in near proximity to said main pattern phase center, (c) an overall pattern which combines said main pattern and said auxiliary patterns, said overall pattern having a minimum in the direction of said jamming source, and (d) a plurality of received signals;

matrix means, coupled to said antenna, for feeding said antenna and providing a plurality of output signals, including main pattern signals, related to said received signals;

weighting means, coupled to said matrix means, for weighting a plurality of said output signals to provide a plurality of auxiliary pattern signals;

summing means, coupled to said weighting means and receiving said main pattern signals, for summing said auxiliary pattern signals and said main pattern signals; and receiver means, coupled to said summing means, for providing a radar output signal having attenuated jamming signals.

6. Apparatus according to claim 5 wherein said antenna provides (e) said overall pattern having gain minimums in directions in which said main pattern sidelobes are substantially insensitive to jamming.

7. Apparatus according to claim 5 wherein said matrix means includes a Butler matrix.

8. Apparatus according to claim 5 wherein said matrix means includes a Maxson matrix.

9. Apparatus according to claim 5 further including limiting means, coupled between said antenna and said matrix means, for amplitude limting the auxiliary pattern signals.

10. Apparatus according to claim 9 further including:

phase shift means, coupled to said antenna, for phase shifting said received signals; and power divider means, coupled to said phase shift means, for receiving the phase shifted received signals and providing said main signals to said summing means.

11. Apparatus for reducing the power of jamming signals produced by a jamming source and received by a sole radar antenna not utilizing a secondary antenna, said sole antenna comprising:

lens-fed array antenna for providing (a) a main radiation pattern having a main radiation lobe in a given direction, sidelobes, and a phase center, (b) a plurality of auxiliary radiation patterns, each being directional and having a minimum gain in the direction of said main pattern maximum radiation lobe, each auxiliary pattern having a phase center in near proximity to said main pattern phase center, (c) an overall pattern which combines said main pattern and said auxiliary patterns, said overall pattern having a minimum in the direction of said jamming source, and (d) a plurality of received signals;

a plurality of primary sources for feeding said lens-fed antenna and for providing a plurality of output signals, including main pattern signals, related to said received signals;

weighting means, coupled to said plurality of primary sources for weighting a plurality of said output signals to provide a plurality of auxiliary pattern signals;

summing means, coupled to said weighting means and receiving said main pattern signals, for summing said auxiliary pattern signals and said main pattern signals; and receiver means, coupled to said summing means, for providing a radar output signal having attenuated jamming signals.

12. Apparatus according to claim 11 wherein said lens-fed antenna provides (e) said overall pattern having gain minimums in directions in which said main pattern sidelobes are substantially insensitive to jamming.

13. Apparatus according to claim 11 wherein said lens-fed antenna includes an aplanatic lens-fed antenna.

14. Apparatus for reducing the power of jamming signals produced by a jamming source and received by a sole radar antenna not utilizing a secondary antenna, said sole antenna comprising:

a reflector array antenna for providing (a) a main radiation pattern having a main radiation lobe in a given direction, sidelobes, and a phase center, (b) a plurality of auxiliary radiation patterns, each being directional and having a minimum gain in the direction of said main pattern maximum radiation lobe, each auxiliary pattern having a phase center in near proximity to said main pattern phase center, (c) an overall pattern which combines said main pattern and said auxiliary patterns, said overall pattern having a minimum in the direction of said jamming source, and (d) a plurality of received signals;

an array of primary sources for feeding said reflector array antenna and for providing a plurality of output signals, including main pattern signals, related to said received signals;

weighting means, coupled to said array of primary sources for weighting a plurality of said output signals to provide a plurality of auxiliary pattern signals;

summing means, coupled to said weighting means and receiving said main pattern signals, for summing said auxiliary pattern signals and said main pattern signals; and receiver means, coupled to said summing means, for providing a radar output signal having attenuated jamming signals.

15. Apparatus according to claim 14 wherein said reflector array antenna provides (e) said overall pattern having gain minimums in directions in which said main pattern sidelobes are substantially insensitive to jamming.

16. Apparatus according to claidm 14 wherein said array of primary sources includes a monopulse main source surrounded by a plurality of auxiliary sources, each auxiliary source establishing a directional auxiliary radiation pattern in a predetermined direction of expected jamming signals.

17. Apparatus according to claim 14 wherein said plurality of array antennas provides (e) said overall pattern having gain minimums in directions in which said main pattern sidelobes are substantially insensitive to jamming.

18. Apparatus for reducing the power of jamming signals produced by a jamming source and received by a sole radar antenna not utilizing a secondary antenna, said sole antenna comprising:

a plurality of array antennas for providing (a) a main radiation pattern having a main radiation lobe in a given direction, sidelobes, and a phase center, (b) a plurality of auxiliary radiation patterns, each being directional and having a minimum gain in the direction of said main pattern maximum radiation lobe, each auxiliary patten having a phase center in near proximity to said main pattern phase center, (c) an overall pattern which combines said main pattern and said auxiliary patterns, said overall pattern having a minimum in the direction of said jamming source, and (d) a plurality of received signals;

a chandelier divider for feeding said plurality of array antenna and for providing a plurality of output signals, including main pattern signals and a plurality of auxiliary pattern signals, related to said received signals, said Chandelier divider including a plurality of directional couplers;

summing means, coupled to said chandelier divider and receiving said main pattern signals, for summing said auxiliary pattern signals and said main pattern signals; and receiver means, coupled to said summing means, for providing a radar output signal having attenuated jamming signals.

19. Apparatus according to claim 18 wherein said directional couplers include magic-T couplers.

20. Apparatus according to claim 18 wherein said directional couplers include hybrid ring couplers.

21. Apparatus according to claim 18 wherein the output signals provided by said chandedlier divider include:

sum path signals for establishing said main pattern signals; and difference path signals, separation path signals, and double difference path signals, all of which establish said auxiliary pattern signals.

* * * * *